(12) United States Patent
Scott

(10) Patent No.: US 9,363,009 B2
(45) Date of Patent: Jun. 7, 2016

(54) ROUTING INFORMATION THROUGH A BLOCKING SPLITTER-COMBINER NETWORK

(75) Inventor: James P. Scott, Manhattan Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 1085 days.

(21) Appl. No.: 13/350,851

(22) Filed: Jan. 16, 2012

(65) Prior Publication Data

US 2013/0182639 A1    Jul. 18, 2013

(51) Int. Cl.
*H04B 7/185* (2006.01)

(52) U.S. Cl.
CPC .................. *H04B 7/18506* (2013.01)

(58) Field of Classification Search
None
See application file for complete search history.

(56) References Cited

U.S. PATENT DOCUMENTS

| | | | |
|---|---|---|---|
| 5,402,478 A * | 3/1995 | Hluchyj | H04Q 3/66 379/115.01 |
| 5,870,406 A | 2/1999 | Ramesh et al. | |
| 6,112,085 A * | 8/2000 | Garner | H04B 7/18539 455/428 |
| 6,157,812 A | 12/2000 | Sarraf | |
| 6,208,859 B1 * | 3/2001 | Halvorson | H04B 7/18567 340/988 |
| 6,266,329 B1 | 7/2001 | Lazaris-Brunner et al. | |
| 6,301,476 B1 | 10/2001 | Monte et al. | |
| 6,324,184 B1 * | 11/2001 | Hou | H04L 12/2801 370/468 |
| 6,408,164 B1 | 6/2002 | Lazaris-Brunner et al. | |
| 6,522,643 B1 | 2/2003 | Jacomb-Hood et al. | |
| 6,574,794 B1 * | 6/2003 | Sarraf | H04N 7/20 348/E7.093 |
| 6,594,469 B1 | 7/2003 | Serri et al. | |
| 6,611,812 B2 | 8/2003 | Hurtado et al. | |
| 6,665,518 B1 | 12/2003 | Courtney et al. | |
| 6,813,492 B1 | 11/2004 | Hammill et al. | |
| 7,024,158 B2 | 4/2006 | Wiswell | |
| 7,120,446 B2 * | 10/2006 | Iwamura | H04W 48/06 455/435.3 |
| 7,464,180 B1 * | 12/2008 | Jacobs | H04L 47/2441 370/395.42 |

(Continued)

FOREIGN PATENT DOCUMENTS

| | | |
|---|---|---|
| EP | 1 860 795 | 11/2007 |
| EP | 2 184 866 | 5/2010 |

OTHER PUBLICATIONS

Herzog, S. RFC 3181, "Signaled Preemption Priority Policy Element", Oct. 2001.*

(Continued)

*Primary Examiner* — Ayaz Sheikh
*Assistant Examiner* — Faiyazkhan Ghafoerkhan
(74) *Attorney, Agent, or Firm* — Patterson & Sheridan, LLP

(57) ABSTRACT

Concepts and technologies disclosed herein for routing information through a blocking splitter-combiner switching network. A control system can execute a control module and communicates with one or more satellites. The control module can generate and transmit control data for controlling traffic or other communication over a channelizer at a satellite. A satellite network operator can generate a cross-connection request that is processed by the satellite control at a ground control station or a processor on the satellite. The cross-connection requests a cross-connection for transmitting satellite user information within or across satellite beams. The control system can attempt to identify an output channel. If the output channel is found, the connection can be established. If the output channel is not found, the control system can execute various operations to partially or fully preempt other communications to accommodate a higher priority connection request.

19 Claims, 5 Drawing Sheets

(56) References Cited

U.S. PATENT DOCUMENTS

| | | | |
|---|---|---|---|
| 7,469,141 B2* | 12/2008 | Macridis | H04B 7/18539 370/468 |
| 7,542,716 B2 | 6/2009 | Bell et al. | |
| 7,912,472 B2* | 3/2011 | Beziot | H04W 72/10 455/450 |
| 8,064,920 B2 | 11/2011 | Bell et al. | |
| 8,077,760 B2* | 12/2011 | Chen | H04B 7/18515 375/211 |
| 8,792,340 B2* | 7/2014 | Chu | H04L 47/245 370/229 |
| 2001/0012277 A1 | 8/2001 | Campanella | |
| 2003/0032391 A1 | 2/2003 | Schweinhart et al. | |
| 2003/0118024 A1* | 6/2003 | Lee | H04L 45/24 370/395.1 |
| 2004/0029592 A1* | 2/2004 | Shyy | H04L 12/5695 455/453 |
| 2004/0185775 A1* | 9/2004 | Bell | H04B 7/18515 455/12.1 |
| 2005/0102256 A1* | 5/2005 | Bordawekar | G06F 17/30923 |
| 2008/0253333 A1* | 10/2008 | Hong | H04W 28/20 370/331 |
| 2010/0180275 A1* | 7/2010 | Neogi | G06F 1/3203 718/1 |
| 2010/0214996 A1* | 8/2010 | Santhanam | H04W 76/066 370/329 |
| 2010/0246587 A1* | 9/2010 | Schutz | H04L 45/00 370/401 |
| 2011/0058473 A1* | 3/2011 | Krym | H04W 48/06 370/232 |
| 2011/0191461 A1* | 8/2011 | Dasgupta | G06F 15/173 709/224 |
| 2011/0208754 A1* | 8/2011 | Li | G06F 17/30289 707/750 |
| 2014/0362850 A1* | 12/2014 | Wakely | H04M 7/0066 370/352 |

OTHER PUBLICATIONS

U.S. Official Action dated Sep. 19, 2007 in U.S. Appl. No. 10/767,000.
U.S. Official Action dated Nov. 14, 2007 in U.S. Appl. No. 10/767,000.
U.S. Official Action dated Mar. 31, 2008 in U.S. Appl. No. 10/767,000.
U.S. Official Action dated Sep. 16, 2008 in U.S. Appl. No. 10/767,000.
U.S. Notice of Allowance dated Dec. 9, 2008 in U.S. Appl. No. 10/767,000.
U.S. Official Action dated Jan. 13, 2011 in U.S. Appl. No. 12/400,357.
U.S. Official Action dated May 6, 2011 in U.S. Appl. No. 12/400,357.
U.S. Notice of Allowance dated Aug. 29, 2011 in U.S. Appl. No. 12/400,357.
Dai, J.G. et al., "The Throughput of Data Switches With and Without Speed Up," Dec. 2006.
Krishna, P. et al., "On the Speedup Required for Work-Conserving Crossbar Switches," IEEE Journal on Selected Areas in Communications, vol. 17, No. 6, Jun. 1999.
Prabhakar, B. et al., "On the Speedup Required for Combined Input and Output Queued Switching," IEEE International Symposium on Information Theory, Aug. 1998.
U.S. Office Action dated Nov. 28, 2012 in U.S. Appl. No. 13/251,539.
U.S. Office Action dated Jul. 10, 2013 in U.S. Appl. No. 13/251,539.
U.S. Final Office Action dated Apr. 16, 2013 in U.S. Appl. No. 13/251,539.
Extended European Search Report dated Sep. 3, 2014 from EP Application Serial No. 12193365.9.
U.S. Official Action dated May 2, 2012 in U.S. Appl. No. 13/251,539.
U.S. Official Action dated Jan. 18, 2012 in U.S. Appl. No. 13/251,539.

* cited by examiner

ROUTING INFORMATION THROUGH A BLOCKING SPLITTER-COMBINER NETWORK

TECHNICAL FIELD

The present disclosure relates generally to routing information and, more particularly, to routing information through a blocking splitter-combiner network.

BACKGROUND

Satellites are sometimes used to relay communications around the world and/or to communicate with various airborne or remotely located vehicles, structures, or networks. For example, some military vehicles and/or posts use satellite transceivers to communicate with military networks. As such, an unmanned vehicle may be piloted and/or controlled via satellite links with the unmanned vehicle. To enable these and other satellite communications, communications satellites are used to route various communication streams around the world and/or among a constellation of communications satellites.

In some implementations, communications satellites have a switch that allows any satellite to connect to any other satellite beam in a configurable manner. Switches that perform subchannel filtering at the switch input and subchannel combining at the switch output are referred to in some embodiments as a "channelizer." The channelizer functions by providing a collection of input paths that can be cross-connected to a collection of output paths to route subchannel information content in response to a cross-connection request.

Switch fabrics (or channelizers) may employ internal speedup factors or internal switching stages in order to mitigate the effects of blocking. As used herein, "blocking" refers to a state in which the fabric or channelizer operates in which sufficient inputs and outputs are, in theory, available, but an incoming cross-connection request cannot be accommodated by the channelizer. Switch fabrics (or channelizers) may be designed to be "strictly non-blocking" if the design contains sufficient internal speedup and/or internal switching stages and ports. A strictly non-blocking switch will never experience blocking conditions. Conversely, a switch fabric may be designed to be "rearrangeably non-blocking" where cross-connects through the switch fabric are dynamically rearranged by a control algorithm in order to eliminate or minimize blocking. Unfortunately, designing extremely high capacity strictly non-blocking channelizers is beyond the capability of current space-qualified ASIC technology. Further, the complexity and operational delays associated with dynamically reprogramming the subchannel filters and combiners in a channelizer render a rearrangeably non-blocking channelizer design moot. As such, extremely high capacity (i.e. terabit scale) channelizer designs are inherently blocking and intelligent control algorithms are required to mitigate the effects of blocking.

In some embodiments, the channelizer is controlled by an algorithm for accommodating incoming cross-connection requests. According to various implementations, the algorithm used to control the channelizer is a "first fit increasing" bin-packing algorithm. This algorithm actually leads to a blocking condition in the theoretically fasted possible manner. As such, cross-connection requests may be denied and the satellite may fail to provide communications when requested and/or required even though the channelizer fabric is very lightly utilized.

It is with respect to these and other considerations that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one aspect of the embodiments disclosed herein, a computer implemented method for routing information is disclosed. The method includes computer-implemented operations for receiving a cross-connection request corresponding to a communication path through a switching network, executing a bin-packing algorithm at a control system to achieve a uniformly distributed load across the switch fabric, and in response to determining that the solution exists, establishing the cross-connect from input to output channel corresponding to the solution. In some embodiments, the bin-packing algorithm operates in one or more dimensions, for example as a two-dimensional bin-packing algorithm wherein the two dimensions can include, for example, frequency and bandwidth. This example is illustrative, and the number of dimensions in which the bin-packing is performed are not limited to one, two, or any other number of dimensions.

According to another aspect of the embodiments disclosed herein, another computer implemented method for routing information is disclosed. The method includes computer-implemented operations for receiving, at a control system, information indicating receipt of a cross-connection request received at a satellite or associated ground-based control station, the cross-connection request corresponding to a communication. The method also includes executing a worst-fit increasing bin-packing algorithm at the control system to determine if a worst-fit solution exists for establishing the cross-connect at a channelizer hosted by the satellite. In response to identifying the worst-fit solution, the control system transmits control data to the satellite for establishing the cross-connect between the specified input and output channel corresponding to the worst-fit solution. The method also can include determining if the communication corresponds to a high priority communication, in response to determining that a worst-fit solution does not exist, and in response to determining that the communication corresponds to the high priority communication, determining if a preemption candidate is available. Either full or partial preemption (or both) may be employed.

According to yet another aspect of the embodiments disclosed herein, a system for routing information through a switching network is disclosed. The system includes a control system having a processor (e.g., satellite control processor) for executing a control module stored in a memory to receive, at the control system, information indicating receipt of a cross-connection request at a satellite in communication with the control system. The cross-connection request can correspond to a communication initiated by satellite user communications with the satellite using a satellite terminal. The satellite also can include a channelizer. In various implementations, the control system executes the control system further to execute, at the control system, a worst-fit increasing bin-packing algorithm to achieve a uniformly distributed load across the channelizer input-output paths, to transmit control data to the satellite for establishing the cross-connect over an output channel corresponding to a worst-fit solution determined to exist, in response to determining that the worst-fit solution exists, and in response to determining that a worst-fit solution does not exist, to determine if the communication corresponds to a high priority communication.

The features, functions, and advantages discussed herein can be achieved independently in various embodiments of the concepts and technologies disclosed herein, or may be combined in yet other embodiments, further details of which can be seen with reference to the following description and drawings.

DETAILED DESCRIPTION

Figure 1:
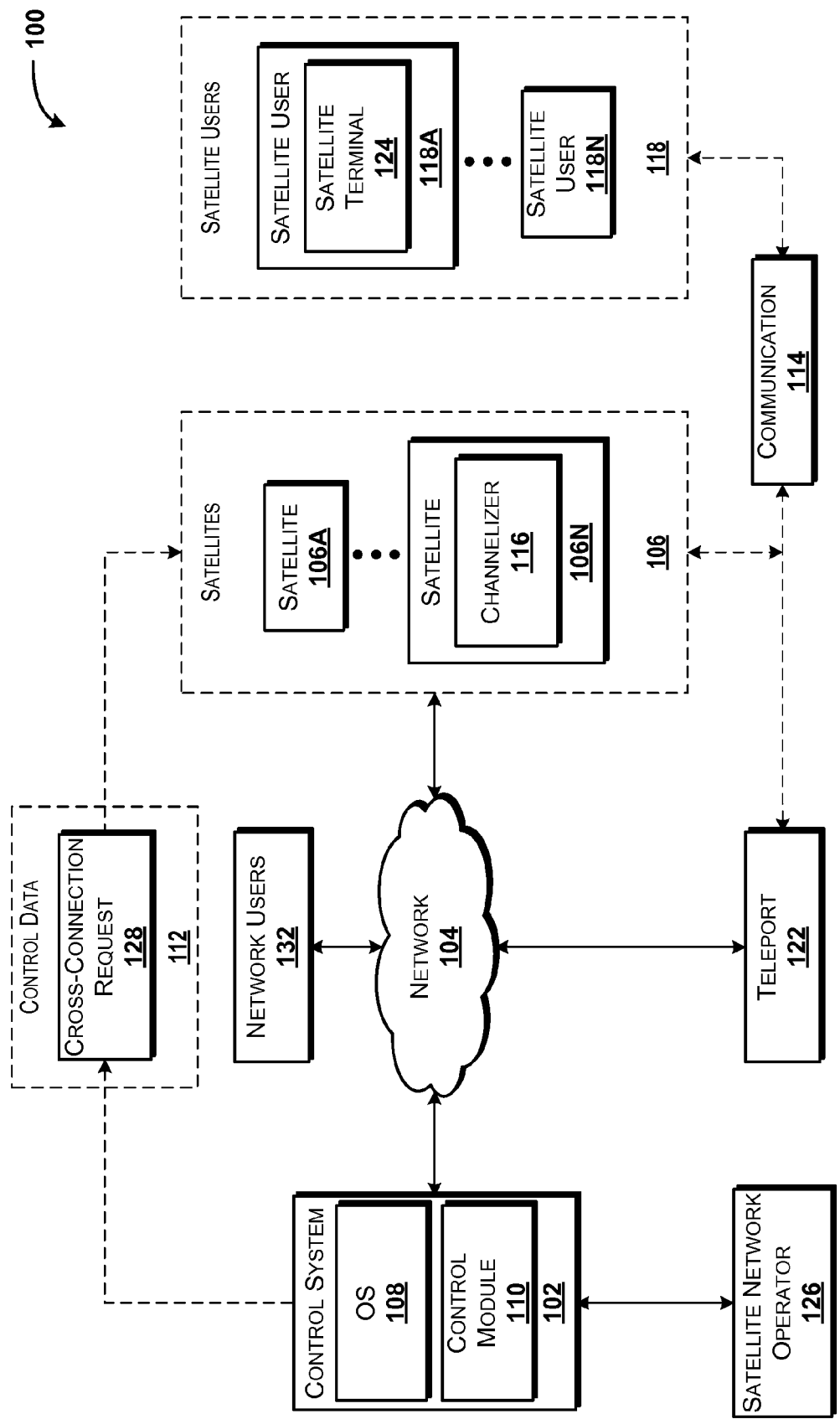
FIG. 1 is a system diagram illustrating an illustrative operating environment for the various embodiments disclosed herein.

The following detailed description is directed to routing information through a blocking splitter-combiner network. A control system executes a control module and communicates with one or more, or a constellation of, satellites. The control module is configured to generate and transmit control data for controlling traffic or other communication routing over splitter-combiner network-based switching fabrics ("channelizers") associated with respective satellites. A satellite network operator generates a cross-connection request that is transmitted to the satellite via a satellite terminal. The cross-connection request can include a request for a cross-connect for transmitting a communication via the satellite, either within a beam or across beams of the satellite coverage area.

The control system assesses the capacity and destination (a recipient) of the communication associated with the cross-connection request and attempts to identify an output channel using a worst-fit increasing bin-packing algorithm. The worst-fit increasing bin-packing algorithm identifies a next available output channel after establishment of the cross-connection. In practice, use of the worst-fit increasing bin-packing algorithm yields a distributed load that is more uniformly distributed than a solution identified using a more commonly used bin-packing algorithm, such as the first-fit increasing algorithm. In some embodiments, requests are pre-sorted and a worst-fit decreasing algorithm is used, though in some embodiments this approach is used only for cross-connection requests received in batches. If the worst-fit increasing bin-packing algorithm identifies an output channel, the connection is established and the algorithm terminates. If a worst-fit solution is not found, the algorithm can assess priorities of the current cross-connection request and compare that priority to those of previously established cross-connections.

If the pending cross-connection request is associated with a high priority communication, the algorithm first attempts a partial or soft preemption. A partial preemption includes finding an established low priority flow that can have its capacity reduced to accommodate the pending high priority cross-connection request. For example, a previously established 8X low priority communication may be reduced to 4X to accommodate a pending 4X high priority cross-connection request, where X denotes an a priori defined unit of capacity. It should be understood that this embodiment is illustrative, and should not be construed as being limiting in any way.

If no partial preemption candidate is determined, the algorithm can search for an existing low priority cross-connection that can be fully (or hard) preempted. Thus, the low priority communication can be de-established in order to make resources or a portion of allocated resources available for the pending cross-connection. In various implementations, preemption only occurs under heavy switch fabric loading conditions. When preemption occurs, however, the algorithm succeeds in pushing out low priority traffic to make room for high priority a traffic, a mathematically optimal resource allocation strategy. These and other advantages and features will become apparent from the description of the various embodiments below.

In the following detailed description, references are made to the accompanying drawings that form a part hereof and that show, by way of illustration, specific embodiments or examples. In referring to the drawings, like numerals represent like elements throughout the several figures.

Referring now to FIG. 1, aspects of one operating environment 100 for the various embodiments presented herein will be described, according to an illustrative embodiment. The operating environment 100 shown in FIG. 1 includes a control system 102. In some embodiments, the control system 102 operates on or in communication with one or more communications networks (hereinafter referred to as a "network") 104, though this is not necessarily the case. According to various embodiments, the network 104 includes a number of over-the-air ("OTA") interfaces via which the control system 102 communicates with one or more satellites 106A-N (hereinafter collectively and/or generically referred to as "satellites 106"). The satellites 106 are described in more detail below.

According to various embodiments, the functionality of the control system 102 is provided by one or more computing devices such as, for example, a personal computer ("PC") such as a desktop, tablet, or laptop computer system; a server computer; an embedded computer system; and/or other types of computing systems. Although not shown in FIG. 1, the control system 102 can be associated with and/or operated at an operations center, though this is not necessarily the case. The control system 102 can also be distributed such that some functions are hosted in an operations center, while others are hosted on the satellite payload. While the functionality of the control system 102 is described herein as being provided by a server computer, it should be understood that this embodiment is illustrative, and should not be construed as being limiting in any way.

According to various embodiments, the control system 102 is configured to execute an operating system 108 and one or more application programs such as, for example, an information routing and control module ("control module") 110 and/or other application programs. The operating system 108 is a computer program for controlling the operation of the control system 102. The control module 110 is an executable program configured to execute on top of the operating system 108 to provide the functionality described herein for routing information through a blocking splitter-combiner network in order to provide near-optimal resource allocation for high-priority users.

The control module 110 is configured to provide functionality for generating and transmitting control data 112. In some embodiments, the control data 112 is generated and/or stored at the control system 102. The control data 112 can be stored in a memory or other suitable data storage component of the control system 102. The control data 112 also can be stored at a data storage device associated with the control system 102 and/or in communication with the control system 102 such as, for example, a network hard drive, a remote server, a virtual storage device, combinations thereof, or the like. It should be understood that these embodiments are illustrative, and should not be construed as being limiting in any way.

In other embodiments, the control data 112 can be received and/or otherwise obtained at the control system 102. For example, in some embodiments a user such as, for example, a network engineer, or other entity, can generate the control data 112 via interactions with various systems or network nodes. The control data 112 can be stored at various devices and/or otherwise created at or shared with the control system 102. Regardless of how the control data 112 is obtained by the control system 102, the control system 102 can transmit the control data 112 to one or more, or a constellation of, satellites 106.

The control data 112 can include routing decisions and/or rules generated by the control module 110 for routing traffic such as, for example, communications, data streams, or other information ("communications") 114 through the satellites 106, as will explained in more detail below. The routing decisions can include decisions determined by execution of the methods described below with reference to FIGS. 2-4 and/or other processes. The control data 112 can inform the satellites 106 and/or software or hardware associated therewith, how to route the communications 114 through blocking splitter-combiners networks ("channelizers") 116 of the satellites 106. While a channelizer 116 is illustrated only with respect to the satellite 106N, it should be understood that each of the satellites 106 can host or include one or more channelizers 116.

The channelizer 116 includes, according to various embodiments, multiple input modules and multiple output modules. According to one contemplated embodiment, the channelizer 116 has eight input modules and eight output modules, and each of the input/output modules can be configured to process up to two hundred eighty eight 125 MHz subchannels. As such, some embodiments of the channelizer 116 can provide up to two thousand three hundred four subchannel inputs. Furthermore, any of the inputs can be cross-connected to any of two thousand three hundred four subchannel outputs, provided that each of the eight input modules may only transmit forty-eight subchannels to any given output module.

The input subchannels of the channelizer 116 can be aggregated in 1X, 2X, 3X, 4X, 5X, 6X, 7X, and/or 8X bundles. The output subchannels can be aggregated into 1X through 64X bundles, subject to a forty-eight subchannel per output module limit. An illustrative channelizer 116 is disclosed in U.S. Pat. No. 7,542,716, which is hereby incorporated by reference in its entirety. Because other channelizers 116 can be used in accordance with the concepts and technologies disclosed herein, it should be understood that this embodiment is illustrative, and should not be construed as being limiting in any way.

According to various embodiments, the channelizer 116 is configured, via the control data 112, to route data received from or for the satellite users 118. In particular, the control data 112 includes computer code for routing the communications through the channelizer 116. According to various embodiments, the control data 112 includes rules for defining how communications received from the satellite users 118 are to be routed through the channelizer 116. The rules also can include and/or can be based upon a priority scheme defined by one or more authorized entities and/or other considerations. The priority scheme can be used to define relative importance of communications based upon various considerations including, but not limited to, a satellite user 118 associated with the communication; a time, date, or time period in which the communication is received; an identity of a communications recipient; contents of the communication; or other considerations.

The priority scheme can include various scales of relative importance such as, for example, a high/medium/low priority scheme; a numerical scale priority scheme; a letter-based priority scheme; or the like. In one contemplated example, a high/medium/low priority scheme is reflected by the control data 112. Thus, for example, a first communication associated with an unmanned vehicle such as a drone operating in a military theatre may be assigned a "high" priority. As such, communications related to command and control may be given first priority when making routing decisions with regard to the channelizer 116. Similarly, communications associated with logistics or maintenance information may be assigned a "medium" priority or a "low" priority to further govern routing decisions made with regard to traffic through one or more of the satellites 106 and/or the channelizer 116. It should be understood that these embodiments are illustrative, and should not be construed as being limiting in any way.

As shown in FIG. 1, the operating environment 100 also includes a number of satellite users 118A-N (hereinafter collectively and/or generically referred to as "satellite users 118"). The satellite users 118 can include entities that communicate or are configured to communicate via the satellites 106. More particularly, the satellite users 118 can be configured to transmit the communications 114 to a network user 120 attached to the network 104 via a ground terminal ("teleport") 122. In some contemplated embodiments, the satellite users 118 include, but are not limited to, aircraft such as unmanned drones, commercial aircraft, and/or military aircraft; weaponry such as cruise missiles or other weaponry; ships such as aircraft carriers, battleships, yachts, or other ships; other vehicles such as armored vehicles, tanks, personnel carriers, or other vehicles; military posts; command outposts; handheld terminals, backpack-based terminals, asset tracking terminals, and/or any other entities that are configured to access the satellites 106 to conduct communications. As such, the network user 120 can include any sort of entity including, but not limited to, an operations center associated with an aircraft, ship, or other vehicle; a headquarters associated with a post, outpost, base, or other location; or other entity. Because the network user 120 can include any sort of communications recipient, and because the satellite users 118 can include almost any sort of communicator, it should be understood that these embodiments are illustrative, and should not be construed as being limiting in any way.

Each of the satellite users 118 can include, can be coupled to, and/or can otherwise communicate using a satellite terminal 124, e.g., geomobile terminal. The satellite terminal 124 can include hardware and software for communicating with the satellites 106. Thus, the satellite terminal 124 can include a satellite dish or other form of antenna and a transmitter, receiver, and/or transceiver for communicating with the satellites 106 via the antenna. Because satellite terminals are generally understood, the satellite terminal 124 will not be described herein in further detail. Furthermore, while a satellite terminal 124 is illustrated in FIG. 1 only with respect to the satellite user 118A, it should be understood that each of the satellite users 118 can include, be coupled to, and/or communicate with a satellite terminal 124.

In practice, a satellite user 118 can initiate communications with the network user 120 by activating a satellite terminal 124 and attempting to establish communications with the network user 120 via the satellites 106. Before this occurs a network operator 126 generates a cross-connection request 128 based on mission planning information and transmits the cross-connection request 128 to one of the satellites 106 in order to establish inter-beam and/or intra-beam connectivity for the users involved in the mission. One or more of the satellites 106 receive(s) the cross-connection request 128 and can determine if a communication 114 associated with the cross-connection request 128 can be accommodated. According to various embodiments, one or more of the satellites 106 is/are responsive to control data 112 to make this determination and to satisfy the cross-connection request 128 if the communication 114 can be accommodated.

The satellites 106 uses, in various implementations, a channelizer 116 to route the communications 114 from the satellite user 118 to other satellite users 118 or to network users 120. Various embodiments for applying the control data 112 to the cross-connection request 128 and/or the communications 114 are set forth below in detail with reference to FIGS. 2-4. According to various embodiments, the channelizer 116 is controlled by the control system 102 via instructions included in, or transmitted as, the control data 112.

According to one embodiment, one or more of the satellites 106 receive(s) a cross-connection request 128 from the control system 102. The control system 102 can determine if a worst-fit bin-packing solution is available. In some embodiments, for example, the control system 102 can determine if an open output channel exists according to a worst fit increasing bin-packing algorithm. If so, the communication 114 can be accommodated by the identified channel. If not, the control system can determine a priority associated with the communication 114 corresponding to the cross-connection request 128.

If the communication 114 corresponds to a high priority communication, the control system 102 can evaluate other communications occurring via one or more of the satellites 106 and determine if a partial preemption candidate (or candidates) is (are) available at the satellite. A partial preemption candidate can include a communication that is using bandwidth that can instead be used to service the communication 114. Thus, the partial preemption candidate can share bandwidth, use at least a portion of bandwidth or use a portion of allocated resources associated with the partial preemption candidate to support transmission of the communication and/or accommodate the communication 114. As mentioned above, for example, a partial preemption candidate used to transmit a previously-established 8X low priority communication may be reduced to a 4X communication to accommodate a pending 4X high priority cross-connection request 128. It should be understood that this embodiment is illustrative, and should not be construed as being limiting in any way.

If the communication 114 does not correspond to a high priority communication, the control system 102 can determine if the communication 114 corresponds to a medium priority communication. If not, the communication 114 is low priority and can be blocked. If so and/or if a partial preemption candidate is not available to service a high priority communication, the control system 102 can determine if a full preemption candidate exists. A full preemption candidate is a previously established cross-connection that can be removed in order to free an output channel used to accommodate the higher priority cross-connection. If a full preemption candidate does not exist, the communication 114 can be blocked. In either case where the communication is blocked, the control system 102 can be configured to periodically re-check for a full preemption candidate or to see if the priority has been raised to medium or higher for the communication 114. If the full preemption candidate is identified, communications associated with the full preemption candidate can be removed and the output channel previously used to service the full preemption candidate can instead be allocated to handle the higher priority cross-connection request 128.

While the functionality of the control module 110 is described herein as being provided by a single module or application program executing on the control system 102, it should be understood that the concepts and technologies disclosed herein for routing information through a blocking splitter-combiner network can be provided by two or more application programs residing either entirely at a ground-based control station or distributed between the ground and space segments. Similarly, FIG. 1 illustrates a control system 102, a network 104, multiple satellites 106, and multiple satellite users 118. It should be understood, however, that some implementations of the operating environment 100 include multiple control systems, e.g., more than one control system 102, multiple networks 104, e.g., more than one network 104, one or any other number of satellites 106, and/or one or any other number of satellite users 118. Thus, the illustrated embodiments should be understood as being illustrative, and should not be construed as being limiting in any way.

Figure 2:
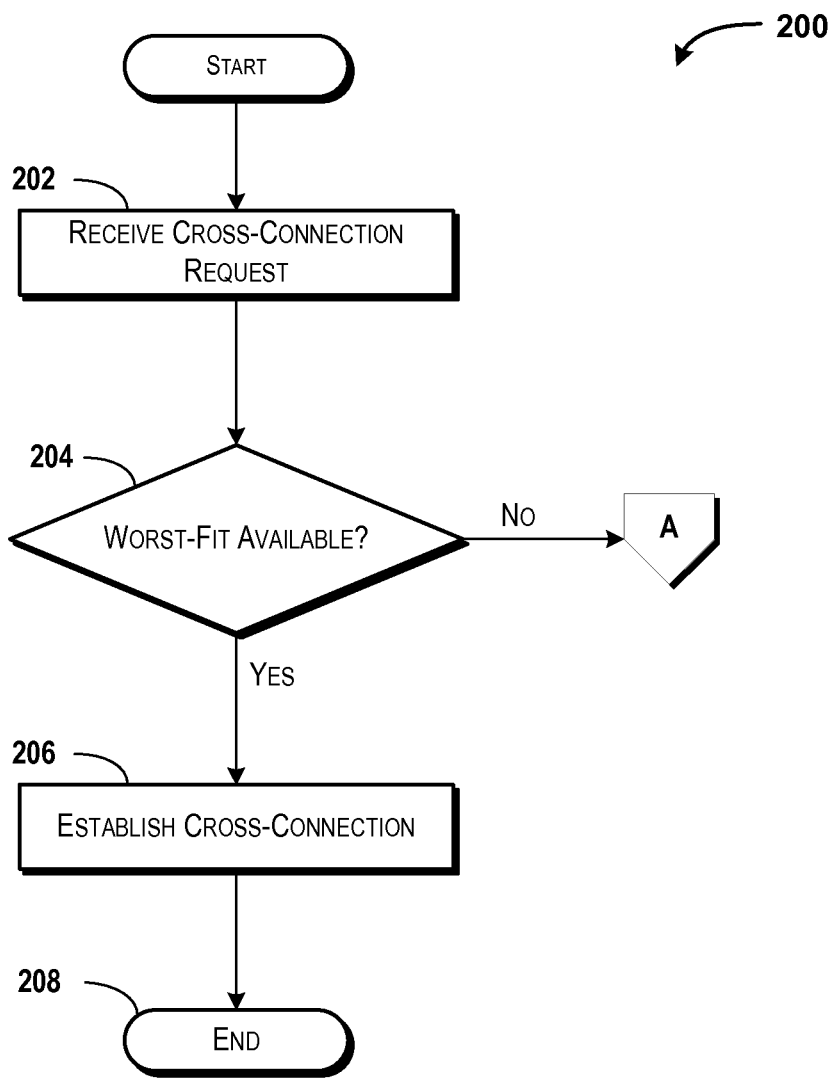
FIG. 2 is a flow diagram showing aspects of a method for routing information through a blocking splitter-combiner network, according to an illustrative embodiment.

Turning now to FIG. 2, aspects of a method 200 for routing information through a blocking splitter-combiner network will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the control system 102 via execution of the control module 110. It should be understood that these embodiments are illustrative, and should not be viewed as being limiting in any way. In particular, it should be understood that any suitable device can be configured to provide the functionality disclosed herein via execution of any suitable program or module.

The method 200 begins at operation 202, wherein the control system 102 receives information relating to a cross-connection request 128. In particular, as explained above, one or more satellites 106 can receive a cross-connection request 128 from a satellite network operator 126. Because routing decisions of one or more of the satellites 106 can be governed by the control system 102 or other systems or devices on the ground or elsewhere, one or more of the satellites 106 can transmit, to the control system 102 or other device, information indicating receipt of the cross-connection request 128. The information can identify the satellite user 118, the communication 114, contents of the communication 114, and/or other information.

From operation 202, the method 200 proceeds to operation 204, wherein the control system 102 analyzes communications occurring via one or more of the satellites 106 to determine if a worst-fit bin-packing solution is available. As explained above, the control system 102 can determine if an open output channel is available for the communication 114 corresponding to the cross-connection request 128 received in operation 202.

In some embodiments, the control system 102 can execute a worst-fit increasing bin-packing algorithm to determine if the worst-fit solution is available. While the worst-fit increasing algorithm can lead to blocking, the worst-fit increasing algorithm also can ensure that traffic is uniformly distributed across the channelizer 114 and therefore can help delay the onset of blocking by reducing skewing of traffic to any particular output subchannel. It should be understood that this embodiment is illustrative, and should not be construed as being limiting in any way.

If the control system 102 determines, in operation 204, that a worst-fit solution is not available for the communication 114, the control system 102 can proceed by executing the operations described below with respect to the method 300 illustrated in FIG. 3. If the control system 102 determines, in operation 204, that a worst-fit bin-packing solution is available, for the communication 114, the method 200 proceeds to operation 206.

At operation 206, the control system 102 issues instructions to the satellites and/or the channelizer 116 to establish a cross-connection to accommodate the communication 114. In some embodiments, the control system 102 establishes the cross-connection over an output channel corresponding to a solution identified by the worst-fit bin-packing algorithm. The control system 102 can issue the instructions as the control data 112, if desired, and transmit the instructions and/or the control data to at least one of the satellites 106. It should be understood that this embodiment is illustrative, and should not be construed as being limiting in any way.

From operation 206, the method 200 proceeds to operation 208. The method 200 ends at operation 208.

Figure 3:
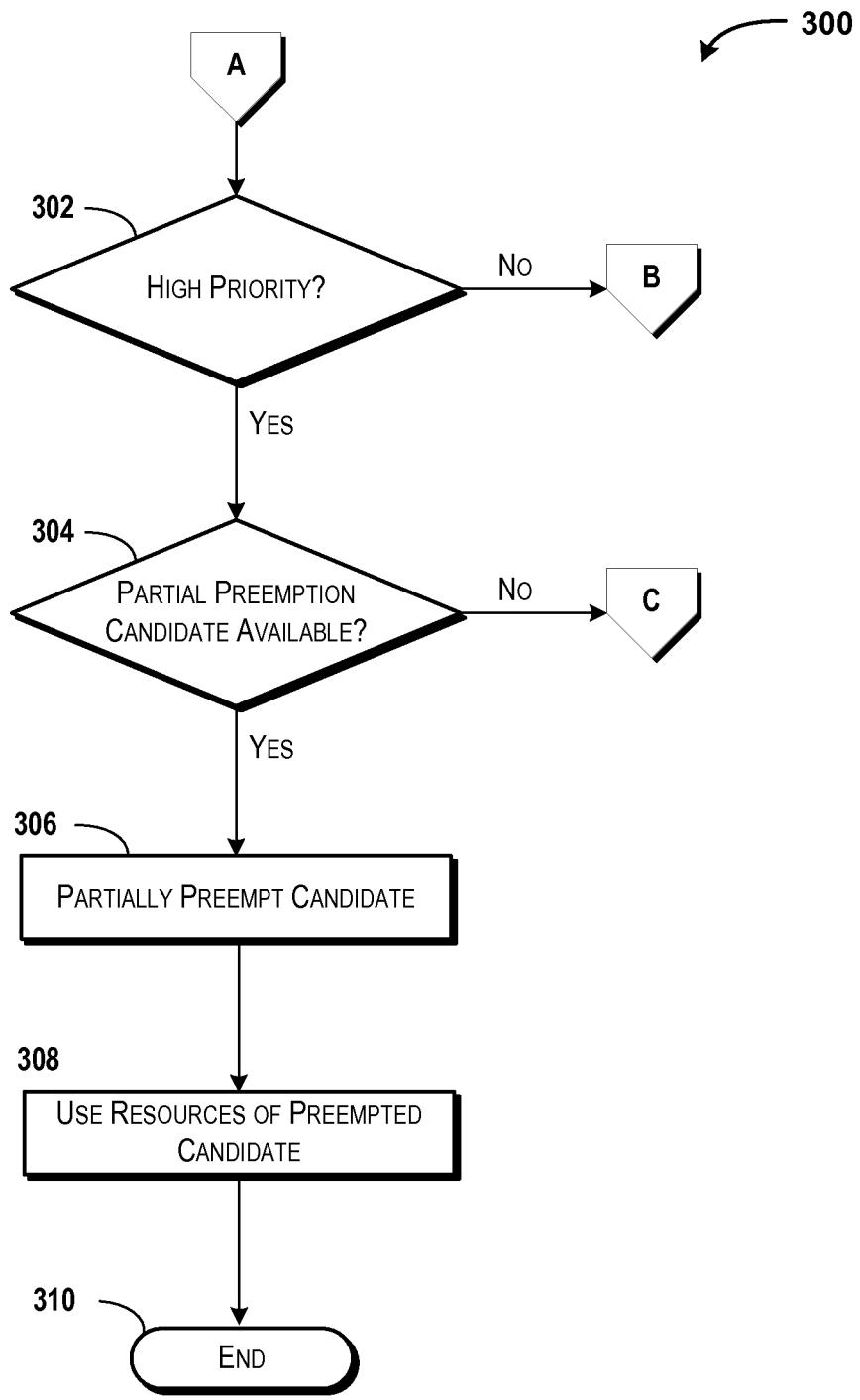
FIG. 3 is a flow diagram showing additional aspects of a method for routing information through a blocking splitter-combiner network, according to another illustrative embodiment.

Turning now to FIG. 3, additional aspects of a method 300 for routing information through a blocking splitter-combiner network will be described in detail, according to an illustrative embodiment. As noted above with reference to FIG. 2, the operations described herein with reference to FIG. 3 can be executed by the control system 102 in response to determining, in operation 204 of the method 200, that a worst-fit bin-packing solution is not available to accommodate the communication 114 corresponding to the cross-connection request 128 received in operation 202. It should be understood that this embodiment is illustrative, and should not be construed as being limiting in any way.

The method 300 begins at operation 302, wherein the control system 102 determines if the communication 114 associated with the cross communication request 128 received in operation 202 is a high priority communication. As explained above, the example of a "high priority" is illustrative, and other ranking and/or priority schemes can be used, if desired. If the control system 102 determines, in operation 302, that the communication 114 corresponding to the cross-connection request 128 received in operation 202 is not a high priority communication, the control system 102 can proceed with execution of operation 402 of the method 400 illustrated in FIG. 4. If the control system 102 determines, in operation 302, that the communication 114 corresponding to the cross-connection request 128 received in operation 202 is a high priority communication, the method 300 proceeds to operation 304.

In operation 304, the control system 102 determines if a partial preemption candidate is available. The control system 102 can review some, all, or none of the previously established cross-connections across the satellite channelizer 116 to determine if the partial preemption candidate is available. According to various embodiments, a "partial preemption candidate" is an existing cross-connection being used for communications that can be modified to share some of the utilized bandwidth to support a cross-connection for the communication 114.

Figure 4:
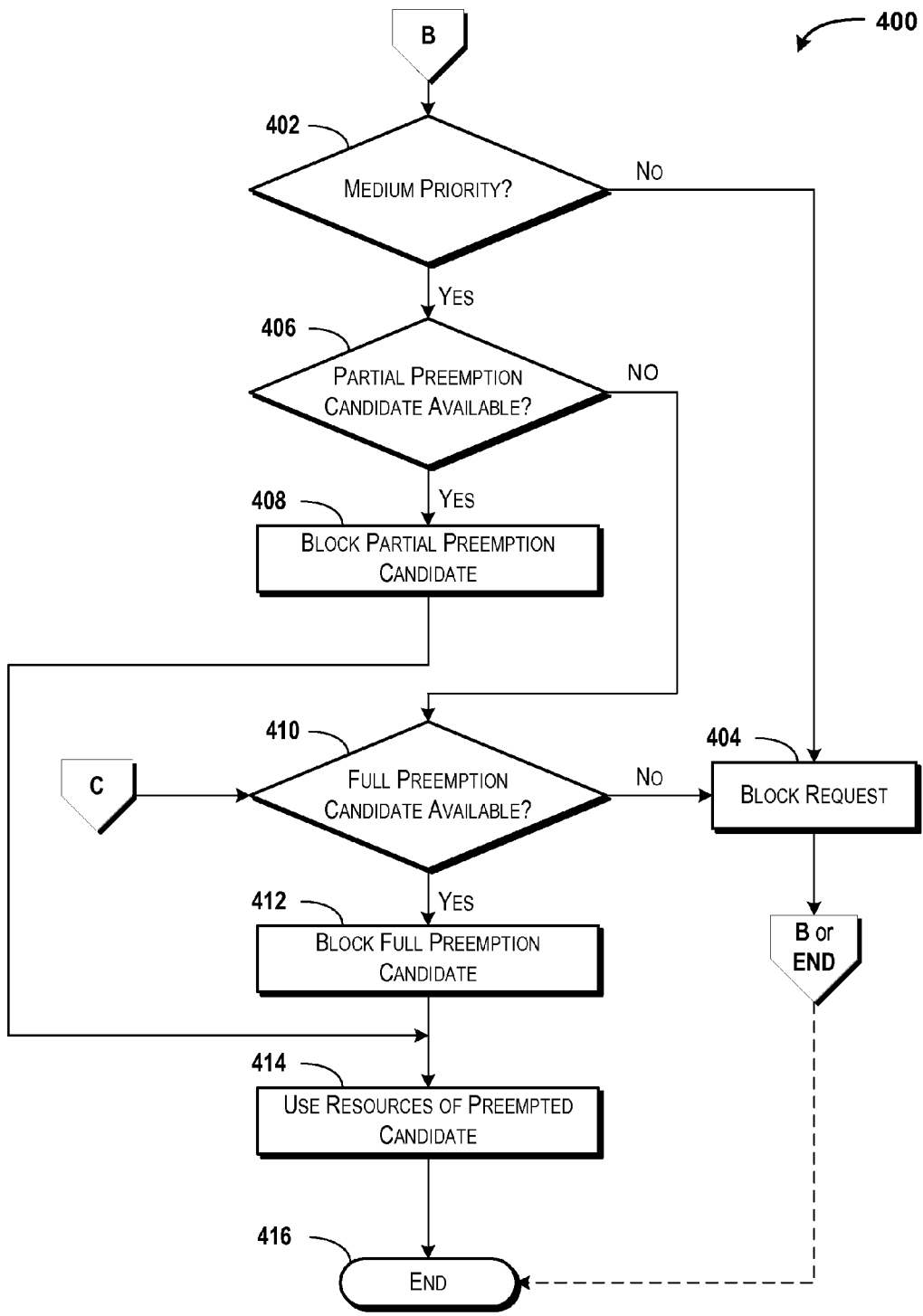
FIG. 4 is a flow diagram showing additional aspects of a method for routing information through a blocking splitter-combiner, according to another illustrative embodiment.

If the control system 102 determines, in operation 304, that a partial preemption candidate is not available, the control system 102 can proceed with execution of operation 410 of the method 400 illustrated in FIG. 4. If the control system 102 determines, in operation 304, that a partial preemption candidate is available, the method 300 proceeds to operation 306.

In operation 306, the control system 102 issues a command to partially preempt the partial preemption candidate identified in operation 304. According to various implementations, the control system 102 can issue a command to share some of the bandwidth used to support communications associated with the partial preemption candidate with the communication 114 corresponding to the cross-connection request 128. Thus, the control system 102 can issue commands to share bandwidth, to establish the communication 114 over the shared bandwidth, and/or for other purposes.

From operation 306, the method 300 proceeds to operation 308, wherein the control system 102 uses at least a portion of the resources or the allocated resources previously used by the partial preemption candidate to accommodate the communication 114 associated with the cross-connection request received in operation 202. Thus, the partial preemption candidate can share some of its resources or a portion of the allocated resources and the communication 114 can be enabled. As such, it can be appreciated that the cross-connection request 128 can be satisfied in operation 308, even if the worst-fit increasing bin-packing algorithm does not provide a solution in operation 204. Thus, the concepts and technologies disclosed herein can be used to reduce blocking of a blocking splitter-combiner network such as the channelizer 116.

From operation 308, the method 300 proceeds to operation 310. The method 300 ends at operation 310.

Turning now to FIG. 4, additional aspects of a method 400 for routing information through a blocking splitter-combiner network will be described in detail, according to an illustrative embodiment. As noted above with reference to FIG. 3, the control system 102 can begin execution of the method 400 in response to determining, in operation 302 of the method 300, that the cross-connection request 128 received in operation 202 does not correspond to a communication 114 having a high priority. Similarly, the control system 102 can begin execution of the operation 410 in response to determining, in operation 304, that a partial preemption candidate is unavailable. Because the functionality described herein with reference to FIG. 4 can be executed by the control system 102 for other reasons and/or at other times, it should be understood that these embodiments are illustrative, and should not be construed as being limiting in any way.

The method 400 begins at operation 402, wherein the control system 102 determines if the cross-connection request 128 received in operation 202 corresponds to a communication 114 having a medium priority. As explained above, various ranking and/or priority schemes can be used in accordance with the concepts and technologies disclosed herein. As such, the example of high, medium, and/or low priorities should be understood as being illustrative and should not be construed as being limiting in any way.

If the control system 102 determines, in operation 402, that the cross-connection request 128 received in operation 202 does not correspond to a communication 114 having at least a medium priority, the method 400 proceeds to operation 404. At operation 404, the control system 102 issues a command to block or reject the communication 114 corresponding to the cross-connection request 128 received in operation 202. As noted above, the commands issued by the control system 102 can, but are not necessarily, included in control data 112 transmitted from the control system 102 to the satellite 102.

If the control system 102 determines, in operation 402, that the cross-connection request received in operation 202 corresponds to at least a medium priority cross-connection request, the method 400 proceeds to operation 406, wherein the control system 102 again determines if a partial preemption candidate (or candidates) is (are) available. As such, the operation 406 can be, but is not necessarily, similar or even identical to the operation 304 described above with reference to FIG. 3.

If the control system 102 determines, in operation 406, that a partial preemption candidate (or candidates) is (are) available, the method 400 proceeds to operation 408, wherein the control system 102 blocks the partial preemption candidate(s) identified in operation 406. As explained above, the blocked candidate(s) can have their resource allocation reduced to accommodate the new cross-connection request received in operation 202. If the control system 102 determines, in operation 406, that a partial preemption candidate is not available, the method 400 proceeds to operation 410.

In operation 410, the control system 102 determines if a full preemption candidate is available to accommodate establishment of the communication 114 corresponding to the cross-connection request 128 received in operation 202. According to various embodiments, the control system 102 determines if there are any communications or other traffic having a priority lower than a priority associated with the communication 114 that can be blocked to open an output channel for establishment of the cross-connection requested in operation 202. Put another way, the control system 102 can determine if there is traffic that can and/or even should be bumped, terminated, or otherwise blocked to accommodate a communication 114 associated with the cross-connection request 128 received in operation 202.

If the control system 102 determines, in operation 410, that a full preemption candidate is not available, the method 400 can again proceed to operation 404, wherein the communication 114 associated with the cross-connection request 128 received in operation 202 can be blocked. As shown in FIG. 4, after blocking the communication 114, execution of the method 400 can end or can return to operation 402. As such, the control system 102 can re-evaluate the priority of the communication 114 and/or can end execution of the method 400 in response to blocking the communication 114 and/or the cross connection request 128. Although not illustrated in FIG. 4, the control system 102 also can return to operation 204 of the method 200 after blocking the communication 114 and/or the cross-connection request 128, if desired. In practice, a configurable timer may be used to ensure that pending cross-connection requests 128 do not circulate through this process indefinitely. These and other options can be configured by users, network personnel, software settings, user settings, and/or other entities.

If the control system 102 determines, in operation 410, that a full preemption candidate is available, the method 400 proceeds to operation 412. In operation 412, the control system 102 issues a command to fully preempt the full preemption candidate identified in operation 412. In particular, the control system 102 issues a command to block a communication associated with the full preemption candidate, as shown in operation 412. As explained above, blocking the full preemption candidate can include removing the communications associated with the full preemption candidate. Thus, an output channel and its associated frequency and bandwidth resources used by the full preemption candidate can be freed via execution of the operation 412 by the control system 102.

From operation 412, the method 400 proceeds to operation 414, wherein the control system 102 uses the output channel previously used by the full preemption candidate to accommodate the communication 114 associated with the cross-connection request received in operation 202. Thus, the full preemption candidate is blocked and the communication 114 is enabled via the output channel previously used to support the full preemption candidate. As such, it can be appreciated that the cross-connection request 128 can be satisfied in a number of ways, even if the worst-fit increasing bin-packing algorithm does not provide a solution in operation 204. Thus, the concepts and technologies disclosed herein can be used to reduce blocking of a blocking splitter-combiner network such as the channelizer 116.

From operation 414, the method 400 proceeds to operation 416. The method 400 ends at operation 416.

While the above description has included embodiments that make use of particular algorithms, it should be understood that the concepts and technologies disclosed herein are not so limited. In particular, the simple first fit increasing algorithm disclosed herein is one example of a heuristic-based bin-packing algorithm that may be suitable for use in accordance with various embodiments of the concepts and technologies disclosed herein. In fact, in some embodiments, almost any heuristic-based bin-packing algorithm can be used to evaluate the cross-connection requests 128. Thus, it can be appreciated that the algorithms disclosed herein and recited in the claims can include any n-dimensional bin-packing algorithms, wherein n denotes any number of dimensions such as bandwidth, frequency, time, other dimensions, or the like. Furthermore, other algorithms may be able to achieve a bin-packing efficiency greater than that of the algorithms disclosed above. As such, the various embodiments of the algorithms disclosed herein should be understood as being illustrative and should not be construed as being limiting in any way.

Figure 5:
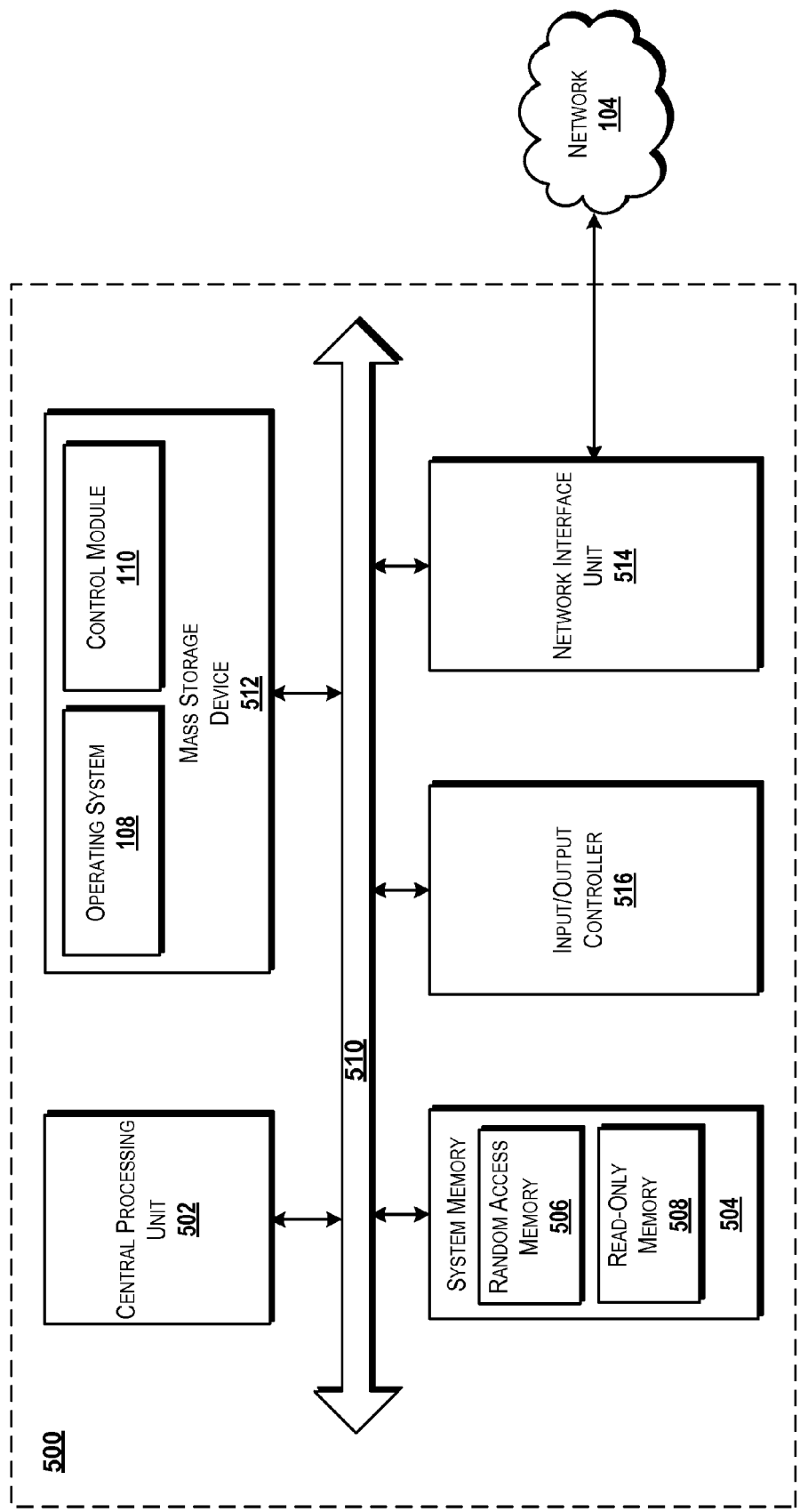
FIG. 5 is a computer architecture diagram illustrating an illustrative computer hardware and software architecture for a computing system capable of implementing aspects of the embodiments presented herein.

FIG. 5 shows an illustrative computer architecture 500 of a control system 102 capable of executing the software components described herein for routing information through a blocking splitter-combiner, according to one embodiment. As explained above, the control system 102 may be embodied in a single computing device or in a combination of one or more processing units, storage units, and/or other computing devices. The computer architecture 500 includes one or more central processing units 502 ("CPUs"), a system memory 504 that includes a random access memory 506 ("RAM") and a read-only memory 508 ("ROM"), and a system bus 510 that couples the memory to the CPUs 502.

The CPUs 502 may be standard programmable processors that perform arithmetic and logical operations necessary for the operation of the computer architecture 500. The CPUs 502 may perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer architecture 500 also includes a mass storage device 512. The mass storage device 512 may be connected to the CPUs 502 through a mass storage controller (not shown) further connected to the bus 510. The mass storage device 512 and its associated computer-readable media provide non-volatile storage for the computer architecture 500. The mass storage device 512 may store an operating system 108, the control module 110, and/or other programs or modules configured to execute the various software elements described herein. The mass storage device 512 also may store the control data 112 and/or other data.

The computer architecture 500 may store programs and data on the mass storage device 512 by transforming the physical state of the mass storage device to reflect the information being stored. The specific transformation of physical state may depend on various factors, in different implementations of this disclosure. Examples of such factors may include, but are not limited to, the technology used to implement the mass storage device 512, whether the mass storage device is characterized as primary or secondary storage, and the like. For example, the computer architecture 500 may store information to the mass storage device 512 by issuing instructions through the storage controller to alter the magnetic characteristics of a particular location within a magnetic disk drive device, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description, with the foregoing examples provided only to facilitate this description. The computer architecture 500 may further read information from the mass storage device 512 by detecting the physical states or characteristics of one or more particular locations within the mass storage device.

Although the description of computer-readable media contained herein refers to a mass storage device, such as a hard disk or CD-ROM drive, it should be appreciated by those skilled in the art that computer-readable media can be any available computer storage media that can be accessed by the computer architecture 500. By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. As used herein and in the claims, the phrase "computer storage medium" does not include transitory computer media such as propagated waves or signals, per se.

According to various embodiments, the computer architecture 500 may operate in a networked environment using logical connections to other systems or devices, which may be accessed through a network such as the network 104. The computer architecture 500 may connect to the network 104 through a network interface unit 514 connected to the bus 510. It should be appreciated that the network interface unit 514 may also be utilized to connect to other types of networks and remote computer systems. The computer architecture 500 also may include an input-output controller 516 for receiving input and providing output to various systems and devices such as a display. The input-output controller 516 may receive input from other devices as well, including a keyboard, mouse, electronic stylus, or touch screen associated with the control system 102 or other systems or devices. Similarly, the input-output controller 516 may provide output to other displays, a printer, or other type of output device.

Based on the foregoing, it should be appreciated that concepts and technologies for routing information through a blocking splitter-combiner are provided herein. Although the subject matter presented herein has been described in language specific to structural features and methodological acts, it is to be understood that the invention defined in the appended claims is not necessarily limited to the specific features or acts described herein. Rather, the specific features and acts are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

I claim:

1. A computer implemented method for routing information, the method comprising computer-implemented operations for:

receiving a cross-connection request corresponding to a communication;

executing, at a control system, one of a worst-fit increasing bin-packing algorithm and a worst-fit decreasing bin-packing algorithm to determine whether at least one solution exists for establishing the requested cross-connection;

upon determining that the at least one solution exists, establishing the cross-connection using an output channel corresponding to one solution; and upon determining that no solution exists:
  upon determining that the communication corresponds to a predetermined high priority level, determining whether a preemption candidate comprising one of a partial preemption candidate and a full preemption candidate is available to accommodate the communication, and
  preempting the determined preemption candidate to accommodate the communication.

2. The method of claim 1, wherein the cross-connection request is received at a satellite control processor, and wherein the cross-connection request is associated with a communication generated by a satellite user in communication with the satellite via a satellite terminal.

3. The method of claim 2, wherein the satellite comprises a channelizer via which user communications are cross-connected.

4. The method of claim 3, wherein the channelizer has multiple input modules and multiple output modules.

5. The method of claim 1, wherein preempting the determined preemption candidate comprises partially preempting the partial preemption candidate, upon determining that the partial preemption candidate is available.

6. The method of claim 5, wherein partially preempting the partial preemption candidate comprises using at least a portion of allocated resources associated with the partial preemption candidate to support transmission of the communication.

7. The method of claim 1, further comprising determining whether the communication corresponds to a predetermined medium priority level upon determining that the communication does not correspond to the high priority level.

8. The method of claim 7, further comprising:
  blocking the communication, upon determining that the communication does not correspond to the medium priority level;
  determining whether a full preemption candidate is available upon determining that the communication does correspond to the medium priority communication level; and
  determining whether the full preemption candidate is available upon determining that the partial preemption candidate is not available.

9. The method of claim 8, further comprising upon determining that the full preemption candidate is available, blocking the full preemption candidate and establishing the communication over resources previously used to support the full preemption candidate.

10. The method of claim 9, further comprising generating control data at the control system and transmitting the control data to the satellite, the control data comprising an instruction to block the full preemption candidate and to reestablish the communication over the resources.

11. A computer implemented method for routing information, the method comprising computer-implemented operations for:
  receiving, at a control system, information indicating receipt of a cross-connection request at a satellite, the cross-connection request corresponding to a communication;
  executing, at the control system, one of a worst-fit increasing bin-packing algorithm and a worst-fit decreasing bin-packing algorithm to determine whether a worst-fit solution exists for establishing the requested cross-connection at a channelizer of the satellite;

upon determining that the worst-fit solution exists, transmitting control data to the satellite to establish the cross-connection using an output channel corresponding to the determined worst-fit solution; and
  upon determining that no worst-fit solution exists:
    determining a priority of the communication;
    determining, when the priority of the communication corresponds to a predetermined high priority level, whether a preemption candidate comprising one of a partial preemption candidate and a full preemption candidate is available to accommodate the communication; and
    preempting the determined preemption candidate to accommodate the communication.

12. The method of claim 11, wherein the cross-connection request is associated with a communication generated by a satellite user in communication with the satellite via a satellite terminal, and wherein the satellite comprises a channelizer via which communications are cross-connected.

13. The method of claim 11, wherein preempting the determined preemption candidate comprises partially preempting the partial preemption candidate, upon determining that the partial preemption candidate is available, wherein partially preempting the partial preemption candidate comprises using at least a portion of bandwidth associated with the partial preemption candidate to support transmission of the communication.

14. The method of claim 11, further comprising determining whether the communication corresponds to a predetermined medium priority level upon determining that the communication does not correspond to the high priority level.

15. The method of claim 14, further comprising:
  blocking the communication, upon determining that the communication does not correspond to the medium priority level;
  determining whether a full preemption candidate is available upon determining that the communication does correspond to the medium priority level;
  determining whether the full preemption candidate is available upon determining that the partial preemption candidate is not available; and
  upon determining that the full preemption candidate is available, blocking the full preemption candidate and establishing the communication over resources previously used to support the full preemption candidate.

16. A system for routing information, the system comprising:
  a satellite comprising a channelizer;
  a satellite terminal; and
  a control system communicatively coupled with the satellite and including a processor configured to execute a control module stored in a memory to:
    receive information indicating receipt of a cross-connection request at the satellite, the cross-connection request corresponding to a communication of the satellite terminal;
    execute one of a worst-fit increasing bin-packing algorithm and a worst-fit decreasing bin-packing algorithm to determine whether a worst-fit solution exists for establishing the requested cross-connection at the channelizer;
    upon determining that the worst-fit solution exists, transmit control data to the satellite to establish the cross-connection using an output channel corresponding to the determined worst-fit solution;

upon determining that no worst-fit solution exists, determine whether a priority of the communication corresponds to a predetermined high priority level;

determine, upon determining that the communication corresponds to the high priority level, whether a preemption candidate is available to accommodate the communication, the preemption candidate comprising one of a partial preemption candidate and a full preemption candidate; and preempting the determined preemption candidate to accommodate the communication.

17. The system of claim 16, wherein:

determining whether a preemption candidate is available comprises determining whether a partial preemption candidate is available, upon determining that the communication corresponds to the high priority level; and wherein preempting the determined preemption candidate comprises partially preempting the partial preemption candidate, upon determining that the partial preemption candidate is available.

18. The system of claim 17, wherein the processor executes the control module further to:

determine whether the communication corresponds to a medium priority level upon determining that the communication does not correspond to the high priority level;

block the communication, upon determining that the communication does not correspond to the medium priority level;

determine whether a full preemption candidate is available in response to:
- determining that the communication does correspond to the medium priority level, or
- determining that the partial preemption candidate is not available; and block the full preemption candidate and establishing the communication over resources previously used to support the full preemption candidate, upon determining that the full preemption candidate is available.

19. The system of claim 18, wherein the satellite user comprises an aircraft or geomobile terminal, wherein the communication comprises information streamed to a recipient by the aircraft or geomobile terminal, and wherein the full preemption candidate corresponds to a predetermined low priority level.

* * * * *